United States Patent [19]
Mourot et al.

[11] Patent Number: 4,818,029
[45] Date of Patent: Apr. 4, 1989

[54] VEHICLE ANTI-THEFT DEVICE MAKING AT LEAST ONE WHEEL UNSERVICEABLE, AND A WHEEL COMPRISING THE DEVICE

[75] Inventors: Franck Mourot, Marseille; Jean-Dominique Dana, Tanneron, both of France

[73] Assignee: Compagnie Financiere Saint Nicolas, France

[21] Appl. No.: 930,469

[22] Filed: Nov. 14, 1986

[30] Foreign Application Priority Data

Nov. 15, 1985 [FR] France ................................. 85 16940
Jul. 10, 1986 [FR] France ................................. 86 10106

[51] Int. Cl.$^4$ ............................................. B60C 29/00
[52] U.S. Cl. ................................. 301/5 VH; 180/287; 152/415
[58] Field of Search ................. 152/415; 180/282, 287; 137/50, 53, 56, 57, 59, 223; 301/5 VH

[56] References Cited

U.S. PATENT DOCUMENTS

| | | | |
|---|---|---|---|
| 2,470,873 | 5/1949 | Seitz | 152/415 |
| 2,737,223 | 3/1956 | Platu | 152/415 |
| 3,003,539 | 10/1961 | Tone | 152/415 |
| 3,603,332 | 9/1971 | Cancile et al. | 137/56 |
| 4,375,200 | 3/1983 | Bertani et al. | 180/287 X |
| 4,657,057 | 4/1987 | Ha | 301/5 VH X |

Primary Examiner—James B. Marbert
Attorney, Agent, or Firm—Mason, Fenwick and Lawrence

[57] ABSTRACT

An anti-theft device for a pneumatic-tired vehicle, of the kind comprising means (4) for automatically deflating a tire (5) of the vehicle and deflating the tire (5) when the device is actuated by control means (2) and the vehicle is in motion, the deflating means (4) being moved by the centrifugal force of inertia when the corresponding wheel (3) rotates whereas they are inoperative in other cases, characterized in that the deflating means (4) comprise movable means for closing at least one orifice (7) through which air under pressure can escape from the tire (3), the movable closing means normally sealing the orifice (7) when the device is inoperative and/or the wheel (3) is stationary, whereas they unclose the orifice (7) and allow air to escape when the device is actuated and as soon as the centrifugal force of inertia reaches a sufficient value to move them.

25 Claims, 3 Drawing Sheets

VEHICLE ANTI-THEFT DEVICE MAKING AT LEAST ONE WHEEL UNSERVICEABLE, AND A WHEEL COMPRISING THE DEVICE

The invention relates to an anti-theft device for a vehicle and a wheel comprising the device. It applies more particularly to pneumatic-tired vehicles such as cars, lorries or motor-coaches.

An aforementioned anti-theft device is for protecting a vehicle from theft. There are a wide range of known anti-theft devices. They are usually of three kinds—a first or deterrent type (e.g. alarms or marking) for deterring a potential thief from trying to steel the vehicle, a second or active type (reinforced locks, sterring-wheel locks, safety bars connecting a number of components together, etc) for preventing a potential thief from entering and using the vehicle, and a third and ultimate kind for making the vehicle unserviceable (by cutting off the ignition, the fuel supply or the battery, locking the brakes, etc).

These known devices are usually satisfactory, but none of them really prevent a vehicle being stolen. Thieves are becoming progressively better equipped and have a thorough knowledge of anti-theft devices. They can therefore easily get through the various barriers preventing them from stealing the vehicle, and once they have reached the vehicle interior and put the deterrent devices out of action, they will be able to use the vehicle.

More particularly, thieves easily detect the presence of anti-theft devices of the first or second kind, and often put them out of action. The third kind of devices are also very quickly detected by thieves after they have entered the vehicle, and can easily be handled by a good set of tools.

The inventor has therefore decided that the disadvantages of the known anti-theft devices are due to the fact that they are never irreversible, i.e. they can be manipulated after their presence has been detected and they are actuated too early.

Also, the known devices are relatively complex and bulky.

U.S. Pat. No. 3,003,539 also discloses an anti-theft device rigidly and immovably connected to the tire valve and comprising a deflating means movable under the action of a spring towards the valve closure means so as to open it, and a pivoting means comprising a weight and a lever normally inserted between the deflating means and the closure means but moved by centrifugal force when the wheel rotates and thus enabling the deflating means to co-operate with the closure means and therefore inflate the tire when the wheel rotates. The known device comprises lock means for actuating or inactivating it or for opening the device to check or adjust the air pressure in the tire.

This known device is complicated and awkward to handle. It needs numerous operations for actuating or inactivating it or for checking the tire pressure. It also has a large number of components and is too expensive. Finally and above all, the device is a real danger to the user. This is because the tire may inadvertently be deflated by the device even when inactivated, if one component breaks (e.g. the control bar 50). This risk is all the more serious in that a component usually breaks at high speeds when the stresses and forces, inter alia the centrifugal acceleration, are at the maximum.

The invention aims to obviate the aforementioned disadvantages of the known anti-theft devices and relates to an anti-theft device which makes the vehicle inserviceable after it has been stolen and started up, and does so in a manner which is temporarily irreversible by the thief without being irreversible by the owner.

The invention also relates to an aforementioned device which can easily and quickly be adjusted to any wheel on a new or used car and is also extremely reliable and not a danger to the user, inter alia when the device is inoperative and at high speed. Another aim of the invention is to propose an aforementioned device which has a minimum number of components and a minimum cost.

The invention proposes an anti-theft device for a pneumatic-tired vehicle, of the type comprising means for automatically deflating a tire of the vehicle and deflating the tire when the device is actuated by control means and the vehicle is in motion, the deflating means being moved by the centrifugal force of inertia when the corresponding wheel rotates whereas they are inoperative in other cases, characterised in that the deflating means comprise movable means for closing at least one orifice through which air under pressure can escape from the tire, the movable closing means normally sealing the orifice when the device is inoperative and/or the wheel is stationary, whereas they unclose the orifice and allow air to escape when the device is actuated and as soon as the centrifugal force of inertia reaches a sufficient value to move them.

The movable means for automatically closing and for deflating the tire are movable in at least one radial or substantial radial direction of the wheel and towards the exterior of the wheel from their normal closing position; means for returning the inflating means to their normal inoperative position for sealing the orifice are provided and are operative at least when the device is inoperative and/or the wheel is stationary.

Advantageously the device according to the invention comprises safety means which, when the vehicle has reached a preset speed, secure the deflating means in the inoperative position irrespective of the position of the control means, and thus prevent inadvertent or other deflation of the corresponding tire at high speed.

In an advantageous variant of the invention, the device is connected by removable connecting means to at least one vehicle wheel, inter alia to the tire valve, so that it can be quickly and easily removed or installed.

In one possible embodiment, the weight of the movable closing and deflating means can be varied with the state of the device. When the device is inoperative, the weight of the movable closing and deflating means is such that they are held motion-less in the orifice-closing position irrespective of the vehicle speed. On the other hand, at least when the device is operative, the weight of the movable automatic closing and deflating means is such that, as soon as the vehicle speed exceeds a given speed V, the rotation of the wheel moves them against the internal pressure of the tire and/or the return means.

The invention also relates to a wheel comprising a device according to the invention.

An anti-theft device according to the invention makes the stolen vehicle unserviceable, so that a potential thief will have to abandon it on the spot. In the worst case, where the thief immediately notices the anti-theft device according to the invention, so much time will be wasted that it will have at lest a deterrent effect on the thief. More particularly if there are four such devices, one on each wheel, the thief will certainly be discouraged. The time needed for inactivating an anti-theft device is very important in the campaign against car thefts, since thieves have only a short time for committing their villainy.

The invention accordingly provides a simple, inexpensive anti-theft device guaranteeing perfect safety to the user when the device is inoperative.

Other advantages and features of the invention will be clear from the following description of preferred embodiment of the invention, given by way of non-limitative example with reference to the accompanying drawings in which.

Figure 1:
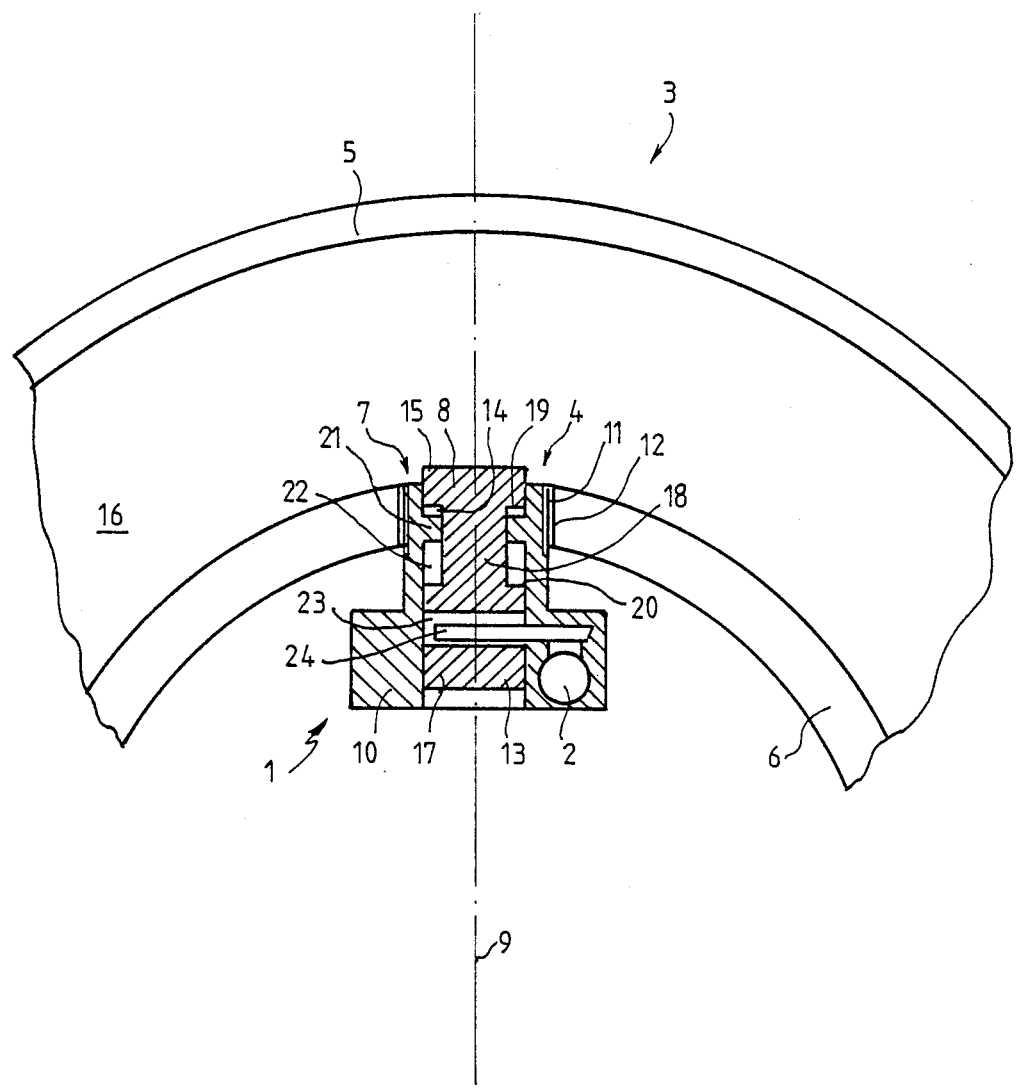
FIG. 1 is a partial diagrammatic view in section in a plane substantially at right angles to the axis of rotation, of a wheel and a device according to a first embodiment of the invention.

An anti-theft device 1 according to the invention for a tired vehicle is of the kind comprising control means 2 for changing over the device 1 from the operative state where it is adapted to prevent the vehicle being stolen, to the inoperative state where it is inactive and enables the vehicle to function normally, and vice versa. The control means can be a lock and are mechanical, electric or electromagnetic. A mechanical lock has the advantage of high reliability, whereas an electric or electromagnetic lock has the advantage of being more tamper-proof.

The device according to the invention is connected to a wheel 3 of the vehicle which is to be protected from theft. An aforementioned device can be provided on a number of wheels or on all four.

A device according to the invention comprises means 4 for automatically deflating at least one vehicle tire 5 and making the corresponding wheel 3 and consequently the vehicle unusable. The "corresponding wheel" means the wheel comprising the tire 5 and the anti-theft device 1. A wheel 3 according to the invention thus comprises a rim 6, a tire 5 around the rim 6 and an anti-theft device 1 according to the invention.

The deflating means 4 are for deflating the tire 5 when device 1 is actuated by the control means and the vehicle is in motion, inter alia as soon as the wheel 3 connected to the device begins to rotate, whereas means 4 are inoperative in other cases, i.e. when device 1 is inactivated or the vehicle stops and wheel 3 is stationary.

Accordingly, the vehicle owner inactivates device 1 when he uses the vehicle, in which case the deflating means 4 are inoperative. When the owner leaves the vehicle, he puts device 1 in the operative position. Since the vehicle is stationary, the deflating means 4 are inoperative, but if wheel 3 rotates as a result of an attempted theft of the vehicle, the deflating means 4 come into operation and deflate the tire 5, thus making wheel 3 and the vehicle unserviceable and frustrating the attempted theft.

The invention thus relates to an anti-theft device for a pneumatic-tired vehicle, of the kind comprising means 4 for automatically deflating a tire 5 of the vehicle and deflating the tire 5 when the device is actuated by control means 2 and the vehicle is in motion, the deflating means 4 being moved by the centrifugal force of inertia when the corresponding wheel 3 rotates whereas they are inoperative in other cases, characterised in that the deflating means 4 comprise movable means for closing at least one orifice 7 through which air under pressure can escape from the tire 3, the movable closing means normally sealing the orifice 7 when the device is inoperative and/or the wheel 3 is stationary, whereas they unclose the orifice 7 and allow air to escape when the device is actuated and as soon as the centrifugal force of inertia reaches a sufficient value to move them.

The movable means for automatically closing and for deflating the tire 5 are movable in at least one radial or substantially radial direction of the wheel 3 and towards the exterior of the wheel 3 from their normal closing position.

The device according to the invention comprises means for returning the deflating means 4 to their normal inoperative position for sealing the orifice 7, at least when the device is inoperative and/or the wheel 3 is stationary.

In a first embodiment of the invention, the device 1 according to the invention is associated with wheel 3 not only when operative but also when inoperative, and it advantageously comprises safety means which operate when device 1 is inoperative and, when the vehicle has reached a preset speed, secure the deflating means 4 in the inoperative position irrespective of the position of the control means 2, so as to prevent inadvertent or other deflation of the corresponding tire 5. Consequently, there is no danger that means 4 will deflate tire 5 when the vehicle is travelling at high speed, above a set speed, and device 1 is inoperative, so that no accident can be caused by inadvertent deflation of tire 5. The safety means can be mechanical means triggered when the centrifugal force reaches a certain value, or can be electric or electromagnetic. They can operate in response to a signal from the vehicle speed-recorder, or in any other way.

FIG. 1 illustrates a first preferred embodiment of the invention in which device 1 is connected to the rim 6 of wheel 3, orifice 7 being formed through rim 6 and the tire 5 being of the kind without an air chamber.

Device 1 comprises a casing 10 rigidly connected to rim 6, e.g. by screwing into aperture 7, in which case the casing 10 has an outer thread 11 co-operating with a thread 12 on aperture 7. Casing 10 holds the entire device 1 and is for securing device 1 to rim 6. Casing 10 has a substantially cylindrical inner bore along an axis 9 and containing a piston 13 sliding along axis 9, in an at least substantially radial direction 9. Piston 13 comprises sealing means 14 at its free end 15 facing the interior 16 of tire 5. The other end 17 of piston 13 cooperates with the control means 2. Threads 11 and 12 are removable means for rigidly and hermetically connecting the device 1 to the rim of wheel 3.

Accordingly, the closure means 8 comprise piston 13 co-operating with casing 10 associated with rim 6. Sealing means 14 are inserted between piston 13 and casing 10 so as to close aperture 7. Preferably, piston 13 has a central part 18 which is narrower (perpendicular to axis 9) than the ends 15, 17 of piston 13. Piston 13 thus has two shoulders 19, 20 near ends 15 and 17 respectively.

Casing 10 also has a flange 21 projecting inside the bore. Flange 21 co-operates with the shoulder 19 of the sealing end 15 of tire 5 so as to form sealing means 14.

A seal can be placed between the two contact surfaces of shoulder 19 and flange 21 so as to improve sealing-tightness. Flange 21 co-operates with the central part 18 of piston 13 and helps to guide it. Finally, return means 22, inter alia a compression spring, are advantageously disposed between flange 21 and shoulder 20 towards the piston end 17 remote from tire 5. The return means 22 return piston 13 to the position where it efficiently closes aperture 7 in sealing-tight manner when tire 5 is fully deflated or wheel 3 stops, so as to press shoulder 19 of piston 13 against flange 21 and ensure sealing-tightness, even if the pressure is zero in the interior 16 of the tire 5. Means 22 return the deflating means 4 to the inoperative position, i.e. return the closure means 8 to the position where they effectively close aperture 7.

The piston end 17 remote from tire 5 co-operates with the control means 2. For this purpose, end 17 advantageously has a bore 23 substantially perpendicular to axis 9 and in which a fork 24 belonging to the control means 2 can slide and lock piston 13 in the position where the deflating means 4 are inoperative, i.e. in the position where it seals aperture 7.

Advantageously the previously-mentioned safety means act on fork 24 and hold it in bore 23 when wheel 3 and/or the vehicle reach a certain speed.

The safety means comprise e.g. a sleeve movable around a casing 10 by the centrifugal force as soon as the rotation speed of wheel 3 exceeds a given value. The sleeve then comes opposite the aperture in the casing through which fork 24 extends when it is moved normally, and prevents fork 24 from moving accidentally.

The bore in casing 10 and piston 13 preferably has a circular cross-section, but this is not necessary provided that their respective shapes correspond so that piston 13 can slide in the bore in sealing-tight manner.

The first embodiment of the invention operates as follows:

When the vehicle owner is using the vehicle in normal manner, fork 24 is inside aperture 23, corresponding to the inoperative state of device 1. In that case, piston 13 cannot slide in the bore in casing 10, and sealing means 14 close aperture 7. The tire therefore remains completely inflated. When the owner leaves his vehicle, he actuates the control means 2 inter alia via a key, thus releasing fork 24 from aperture 23. Piston 13 can then move in the bore in the casing. However, owing to the return means 22 and the pressure inside tire 5, the piston does not move and the closing means continue to close aperture 7 via sealing means 14 which continue to co-operate with flange 21. When the device 1 is thus in the operative state, if wheel 3 rotates the piston 13 is subjected to centrifugal force which moves it in the bore in casing 10 inside tire 5. Consequently, the sealing means 14 no longer co-operate with flange 21 and the air can escape. To facilitate deflation, one or more longitudinal grooves can be formed in the central part 18 and in the end 17 co-operating with the control means 2 or any other device. If not, air infiltrates between piston 13 and casing 10. When tire 5 has been completely deflated or the wheel stops again, piston 13 is returned to its initial position (as shown in FIG. 1) by the return means 22 and/or by the pressure in tire 5, and the deflation process is stopped.

If the vehicle has been stolen and the thief has left it after the tire are flat, the owner will only have to use the actuating means 2 to inactivate the device or devices and re-inflate the tire or tires, e.g. using a known portable compressor.

Figure 2:
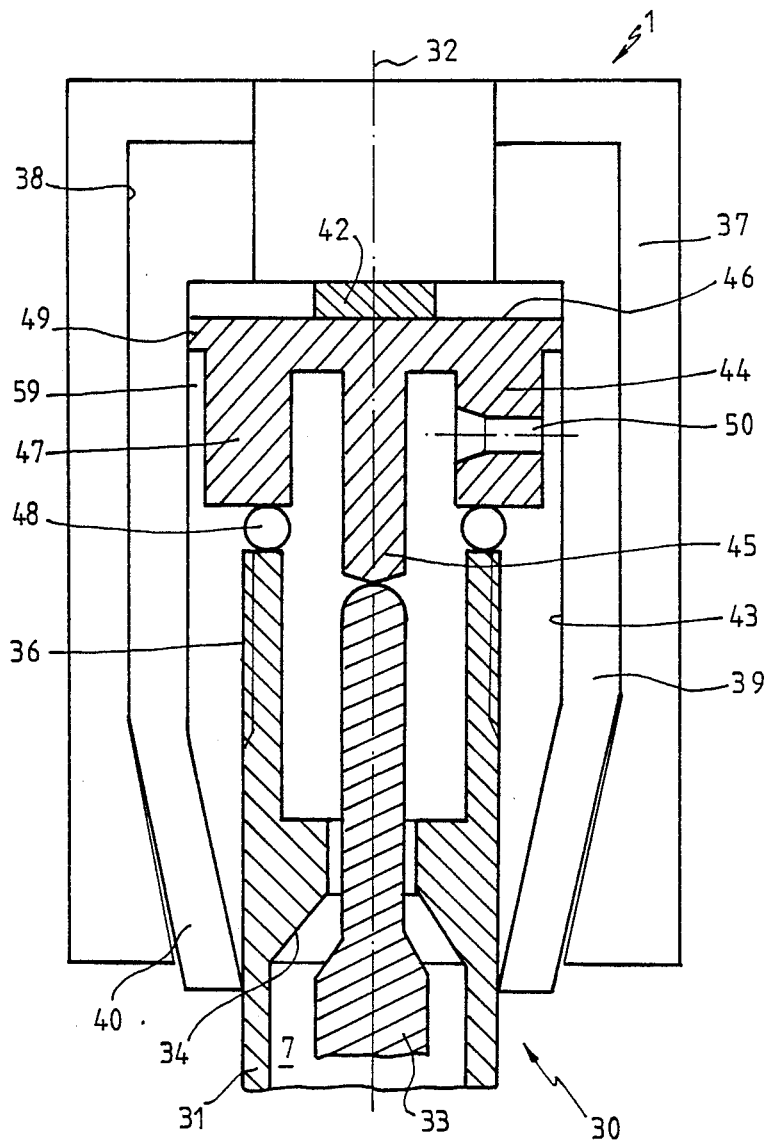
FIG. 2 is a sectional diagram in a plane through the valve axis of a device according to a second embodiment of the invention.
Figure 3:
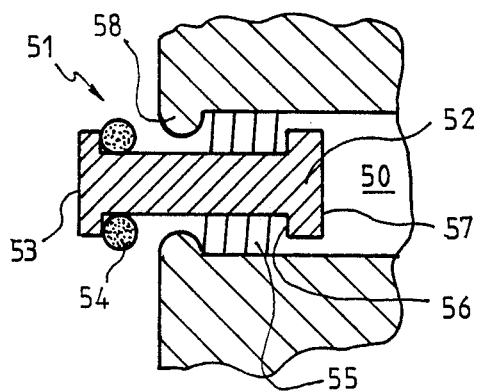
FIG. 3 shows a detail in section through the orifice of the closure plug and the movable means for closing the orifice in the second embodiment of the invention.

In a second preferred embodiment shown in FIGS. 2 and 3, a device 1 according to the invention is connected by means 39 to a valve 30 used in normal operation for inflating and deflating a tire of a vehicle (not shown). The device 1 according to the invention thus takes the place of the normal safety plug for valve 30. Valve 30 is either on an air chamber in the wheel, or is formed on the wheel rim if the wheel is without an air chamber.

According to the invention, the means 19 for connecting device 1 to the wheel 3 comprising tire 5 are movable, so that device 1 can be removed to avoid any risk of inadvertent deflation, but can be quickly and easily installed as soon as it has to be made operative to prevent theft of the vehicle. Device 1 can thus be disconnected from valve 30, which will then be covered by its normal plug, thus avoiding the risk of inadvertent deflation or damage or even loss of the device if the vehicle is frequently used by its owner. Device 1 can also be easily and quickly installed in place of the normal valve plug when the vehicle is stationary and device 1 has to be made operative to prevent theft of the vehicle.

Valve 30 in known manner comprises a substantially cylindrical body 31 of revolution around an axis 30 and a closure means 33 co-operating with a seat 34 of body 31 to seal valve 30. Consequently the orifice 7 blocked by the movable closure means is the orifice of valve 30. Closure means 33 is permanently returned to the valve closure position by the air pressure at the inside 35 of the air-chamber pump. When means 33 is moved towards the interior 35 so as to release seat 34, air can escape through valve 30. At its free end, valve body 31 has an external thread 36 for securing the ordinary plug of valve 30.

Device 1 has an external casing 37 forming an inner bore of revolution 38. The removable connecting means 39 comprise jaws 40 sliding inside bore 38 of casing 37 to form a chuck. Casing 37 bears lock means 41 which can be constructed in various known manners (mechanical, electronic, etc). The lock means 41 co-operate with jaws 40 so as to actuate them and lock the jaws against valve body 31, and also co-operate with a push rod 42. Advantageously means 41 are also used for temporarily locking the device connected to the valve and preventing it from being disconnected from the valve when the device is operative.

In a first variant, the removable connecting means or chuck 39 comprise an internal thread on bore 38 of casing 37 co-operating with external grooves on jaws 40. Jaws 40 are pivoted at their free end and co-operate with a frusto-conical surface of bore 38. Consequently the resulting chuck can be tightened or loosened simply by rotating jaws 40 relative to casing 37. In that case, the lock means 41 are used for securing jaws 40 with respect to casing 37, thus temporarily preventing the jaws from being loosened.

In a second possible variant (not shown), the lock means 41 directly control the motion of jaws 40 and consequently the locking and unlocking thereof with respect to the valve body 31.

The inner surface 43 of jaws 40 forming the chuck is shaped so that a monobloc plug 44 for closing the valve can slide axially. Plug 44 is the means for automatically deflating the wheel when the device is operative and the vehicle is moving. For this purpose, plug 44 is in the form of a cap and comprises a pin 45 extending from the end 46 of plug 44 substantially along axis 31 of valve 30 and towards the interior 35 so as to co-operate with closure means 33 and open valve 30. Plug 44 also has a cylindrical skirt 47 of revolution around axis 37 and extending from the plug end 46 towards the interior. The dimensions of skirt 47 are such that it can be pressed against the free end of valve 30 via a joint 48 for sealing the connection between valve 40 and plug 44.

The aforementioned push-rod 42 when actuated by the lock means 41 co-operates with the end 46 of plug 44 so as to press plug 44 against valve 30. The end 46 of plug 44 has radial dimensions greater than those of skirt 47, thus forming a ring 49 co-operating with the inner surface 43 of jaws 40. Consequently, skirt 47 of plug 44 is not in contact with the inner surface 43 of jaws 40.

The monobloc closure plug 44 is thus used to close the valve and the means 45 for moving closure means 33 to the position for opening valve 30. Plug 44 is also used for automatically deflating the tire. To this end, skirt 47 is formed with at least one orifice 50 through which air can escape to the exterior. Plug 44 also comprises movable means 51 for closing each orifice 50. The movable closing means are not shown in FIG. 2 but are shown in detail in FIG. 3.

Plug 44 preferably has a number of orifices 50 disposed radially in various directions relative to the valve axis 32, and regularly distributed around axis 32. Preferably, plug 44 has three orifices disposed at 120° intervals round the periphery of skirt 47.

Movable means 51 for closing each orifice 50 preferably comprise a piston 52 sliding in orifice 50 and having sealing means 54, inter alia a circular sealing joint, at its outer end 52. Piston 52 is free to move outwards but is returned to the interior to its closure position by return means 55, inter alia comprising a spiral spring wound around piston 52 between an abutment 56 on the inner end 57 thereof and a construction 58 of orifice 50 at its outer end.

The outer end 53 of piston 52 is also shaped as a circular abutment so as to retain the sealing joint 54 and press it against the constriction 58 on orifice 50 under the action of the return spring 55. Piston 52 is made of very heavy material.

The device according to the second preferred embodiment of the invention operates as follows:

When the owner wants to protect his vehicle against theft, he unscrews the normal valve plug for inflating one of his wheels and, instead of the plug, rigidly connects a device 1 according to the invention to valve 30. To this end, he installs device 1 and tightens the jaws 40 of the chuck by rotating casing 37 or actuating the lock means 41, which likewise has the effect of pressing plug 44 against valve 30 and opening it.

When the user takes his key out of the lock means 41, the device 1 is operative, rigidly connected to valve 30, and adapted to deflate the wheel as soon as the vehicle is in motion. The chuck jaws 40 bear on the valve body 31 outside the threading at the end of valve 30. It is thus impossible to disconnect device 1 from valve 30.

Valve 30 extends from the wheel substantially horizontally or at a slight angle thereto. As soon as the wheel begins to rotate, therefore, a centrifugal force is exerted on the respective pistons 52 of at least two radial orifices 50 in plug 44. Above a certain speed, the piston is moved by the centrifugal force of inertia against the action of spring 55 and joint 34 is detached from orifice 50, so that air can travel from the valve interior outwards. Since the skirt 47 of plug 44 does not stick to the inner surface 43 of jaws 40, and since jaws 40 do not provide a hermetic connection to the valve, air can freely escape to the exterior through the free space 59 formed between skirt 47 and surface 43 and via jaws 40, and the wheel is very quickly deflated.

In a variant, the control means, which can be independent of the temporary securing means, are used to actuate or inactivate the device 1. this requires two locking devices, one for securing the jaws 40 against valve body 31, and the other for moving the push rod 42 and thus opening valve 30 and pressing plug 44 against it.

Figure 4:
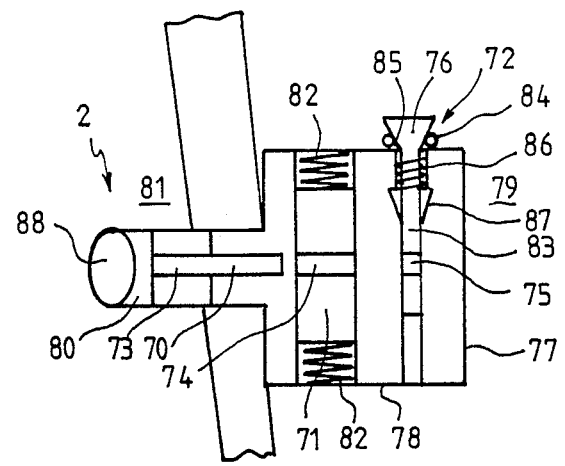
FIG. 4 is a diagrammatic sectional view of a first variant of a third embodiment of the invention.
Figure 5:
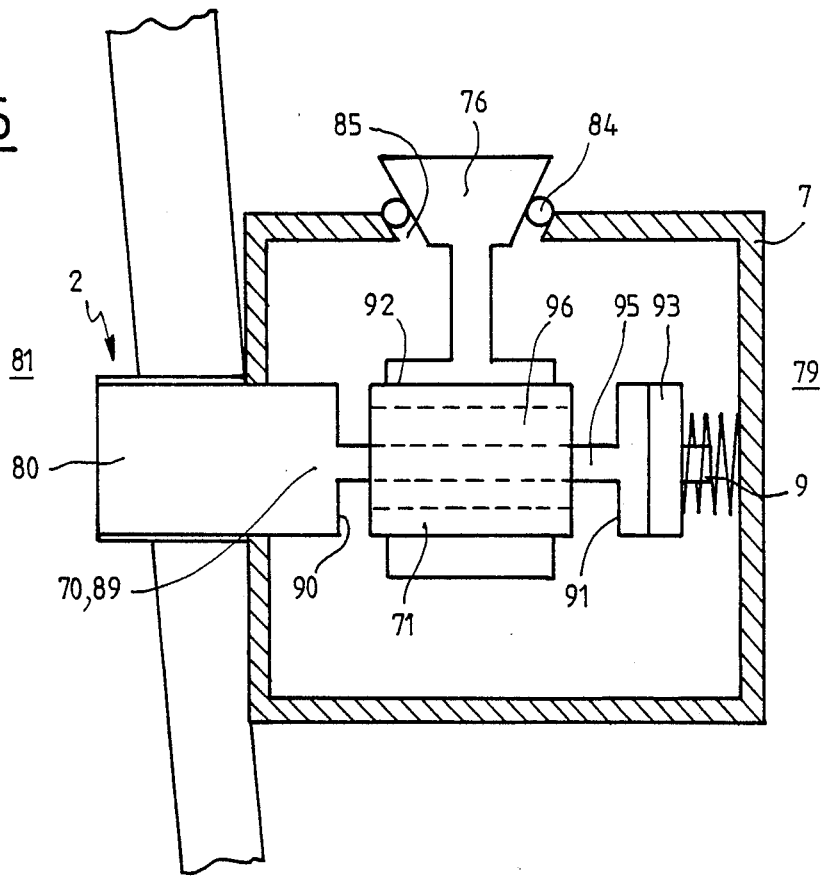
FIG. 5 is a diagram of a second variant of a third embodiment of the invention.

In a third preferred embodiment of the invention shown in FIGS. 4 and 5, the weight of the movable closing and deflating means varies depending on whether the device is operative or inoperative.

At least when the device is operative, the weight of the movable closure means is such that as soon as the vehicle exceeds a given speed V, rotation of wheel 3 moves the movable means by centrifugal inertia, against the internal pressure of tire 5 and/or the return means.

When the device is inoperative, the weight of the automatic movable closure and deflation means is made to depend on the pressure inside tire 5 and/or the power of the return means, so that the movable closure and deflating means are kept motionless in the position for closing orifice 7, irrespective of the speed of the vehicle.

The control means 2 comprise means 70 is rigidly connecting an additional weight 71 to the movable automatic closing and deflating means 8, so as to secure weight 71 to means 8 when the device is actuated, so that means 8 can be moved by the centrifugal force of inertia when the wheel rotates.

FIG. 4 shows a first possible variant of the third embodiment of the invention. In this variant, the means 70 for connecting weight 79 to the movable closure means 72 comprise a lug 73 which can slide under the action of the control means 2 so as to penetrate into and through an orifice 74 in weight 71 and into an orifice 75 in the valve closing means 76.

The transverse dimensions of orifices 74, 75 and closure means 76 are near those of lug 73, so that lug 73 secures weight 71 to means 76 when they move in the radial direction.

Device 1 is for installing in place of the original valve. It comprises a casing 77 having a part 78 dispose at the outside 79 of the wheel, whereas another part 80 forms a projection and extends to the exterior 81 from the wheel. Part 80 contains the control means 2 and the connecting means 70, inter alia lug 73, which is slidingly guided in part 80. Part 78 comprises a weight 71 movable in translation between two retaining springs 82, and closure means 76 which is slidingly guided in a blind bore 83 extending in the radial direction of the wheel and open towards the exterior. Closure means 76 opens into bore 83 on the external side of the wheel, and forms sealing means 84 which normally close the bore opening 85. A return spring 86 urges means 76 into the closing position where it bears against casing 77 and against a shoulder 87 of bore 83.

When lug 73 has not engaged in orifices 74 and 75, the weight of the movable closure means 72 is small and insufficient, relative to the return force of spring 86, for the force of centrifugal inertia to move the closure means 76. The wheel therefore cannot deflate. On the other hand when weight 71 is connected to closure means 76, the total weight of the movable closing means is such that they are moved by the centrifugal force of inertia. Accordingly closure means 76 comes loose from closure 85 and air can escape through bore 83, which is not sealing-tight, and via the free end 88 of projection 80. Lug 73 can move radially in a larger-diameter bore in projection 80. It comprises a perpendicular end disc which guides it during radial motion.

In a second variant of the third preferred embodiment shown in FIG. 5, the additional weight 71 is connected so that it can move radially relative to a push-rod 89 forming part of the control means 2. Weight 71 is inserted between two shoulders 90, 91 respectively for engaging weight 71 in or releasing it from an orifice 92 in closure means 76. Between the two shoulders 90 and 91, the push-rod 89 defines a lug 95 having a smaller diameter than the bore 96 of weight 71. The difference in diameters is sufficient to enable weight 71 to move radially. In the engaged position as shown, weight 71 can move radially under the action of centrifugal force. If on the other hand weight 71 is disconnected by removing the push-rod assembly 89 from orifice 92, a component 93 secured to casing 77 slides under the action of a spring 94 into orifice 92 so as to lock it and prevent any further motion of closure means 76. Consequently the wheel cannot continue to deflate.

The invention also relates to a wheel 3 comprising an anti-theft device according to the invention and preferably of the kind without an air chamber.

Preferably the wheel 3 according to the invention comprises means for immovably connecting wheel 3 to the vehicle, inter alia to the hub, and actuated by lock or other control means preventing wheel 3 from being removed by a person who cannot operate the control means, inter alia a person who does not have the key.

The means for immovably connecting wheel 3 to the vehicle, which thus constitute and anti-theft means for wheel 3, are e.g. bars which secure wheel 3 to the hub when the lock is actuated.

The invention can be varied in numerous ways which are clear to the skilled addressee.

We claim:

1. An anti-theft device for a vehicle having wheels provided with pneumatic tires, each tire having at least one orifice through which air under pressure can escape and a tire-inflating valve, said device being adjustable between an operative state and an inoperative state, said device comprising:
    control means movable between first and second positions for setting said device either in said operative state or in said inoperative state, respectively; and
    deflating and closing means movable between: (1) a normal closed position for sealing the orifice when said device is set in said inoperative state or when the wheel corresponding to the tire is stationary, and (2) an open position for automatically deflating the tire when (a) said device is set in said operative state and (b) the vehicle is in motion, in direct response to the centrifugal force of inertia;
    said deflating and closing means being directly subjected to and moved by the centrifugal force of inertia when said device is set in said operative state and when the corresponding wheel rotates at such a speed that the centrifugal force of inertia reaches a sufficient value to move said movable a deflating and closing means, thus opening the orifice and allowing air to escape from the tire through the orifice.

2. A device according to claim 1, wherein said deflating and closing means is movable in a substantially radial direction of the wheel and towards the exterior of the wheel from its normal closed position.

3. A device according to claim 1, further comprising return means for returning said deflating and closing means to said normal closed position for sealing the orifice, at least when said device is in said inoperative state or the wheel is stationary, or both.

4. A device according to claim 1, wherein the weight of said deflating and closing means varies according to whether said device is set in said operative state or said inoperative state.

5. A device according to claim 3, wherein at least when said device is set in said operative state, the weight of said deflating and closing means is such that as soon as the vehicle speed exceeds a given speed V, the rotation of the wheel moves said deflating and closing means by centrifugal inertia against the internal pressure of the tire or said return means or both.

6. A device according to claim 3, wherein when said device is inoperative, the weight of said deflating and closing means is dependent on the internal pressure of the tire or the power of said return means or both, whereby said deflating and closing means is kept stationary in said closed position, irrespective of the vehicle speed.

7. A device according to claim 4, said deflating and closing means further comprising an additional weight, and said control means comprising securing means for rigidly securing said additional weight to said deflating and closing means when said device is set in said operative state, whereby said deflating and closing means can be moved by the centrifugal force of inertia due to rotation of the wheel.

8. A device according to claim 1, further comprising rigid securing means for securing said device to at least one vehicle wheel.

9. A device according to claim 8, said device being secured to the wheel rim, the tire orifice being formed through the rim.

10. A device according to claim 1, said device being connected to the wheel in both said operative state and said inoperative state, and further comprising safety means for locking said deflating and closing means in said closed position irrespective of the position of said control means when the vehicle has reached a preset speed, to prevent deflation when the corresponding tire is moving at high speed.

11. A device according to claim 1, said deflating and closing means comprising a casing associated with the rim and a piston cooperating with and sliding inside said casing in a substantially radial direction, said piston having sealing means at its free end facing the interior of the tire, said sealing means movable between a piston-open position and a piston-closed position and cooperating with said casing so as to hermetically close said orifice in said piston-closed position.

12. A device according to claim 8, said securing means being removable to avoid risk of premature deflation, and quickly and easily installed as soon as required for preventing theft of the vehicle.

13. A device according to claim 8, said securing means connecting said device to the tire-inflating valve, and the orifice closed by the movable closing means also being the orifice of the tire-inflating valve.

14. A device according to claim 12, said securing means comprising lock means for temporarily securing the device to the wheel to prevent said device from being disconnected from the wheel when said device is set in said operative state.

15. A device according to claim 14, said securing device also being said control means, whereby said device is automatically set in said operative state when connected to the wheel.

16. A device according to claim 14, said control means of said device being independent of said securing means.

17. A device according to claim 13, the tire-inflating valve having closure means movable between a valve-opening position and a valve-closing position for opening and closing the valve, said deflating and closing means comprising opening means for moving the closure means of the valve to the valve-opening position, at least one orifice through which air can escape to the exterior, and movable means for closing each said orifice.

18. A device according to claim 17, the closure means and said opening means each comprising a monobloc closing plug.

19. A device according to claim 17, said opening means including a plurality of orifices disposed in various directions relative to the valve axis.

20. A device according to claim 19, said orifices being disposed radially relative to the valve axis and regularly distributed around the valve axis.

21. A device according to claim 19, said closure means comprising a plug having a skirt and said opening means including three orifices disposed at 120° intervals around the periphery of the skirt.

22. A device according to claim 17, each said movable means for closing each said orifice in said opening means comprising a piston sliding in said orifice, the external end of said piston comprising sealing means and said piston being free to move towards the exterior of said orifice, and return means for returning said piston towards the interior of said orifice to its closing position.

23. A device according to claim 18, said opening means being a plug in the form of a cap and comprising a pin extending from the end of said plug substantially along the valve axis towards the interior of the tire so as to cooperate with the closure means and open the valve.

24. A vehicle wheel for a vehicle comprising:
a pneumatic tire having at least one orifice through which air under pressure can escape from the tire; and
an anti-theft device comprising control means actuable between an operative setting and an inoperative setting and deflating means for automatically deflating said tire when said control means is in said operative setting and the vehicle is in motion, said deflating means being directly subjected to and moved by the centrifugal force of inertia and comprising movable closing means for closing the orifice, said closing means normally sealing the orifice when said control means is in said inoperative setting or when said wheel is stationary, and opening the orifice and allowing air to escape when said control means is in said operative setting and when the rotation of the wheel causes the centrifugal force of inertia to reach a sufficient value to move said closing means, whereby said deflating means automatically deflates said tire when said control means is in said operative setting and said wheel attains a certain speed of rotation and said deflating means is inoperative when said control means is in said inoperative setting or when said wheel has not reached said certain speed of rotation.

25. A wheel according to claim 24, further comprising means for immovably connecting the wheel to the hub of the vehicle, said connecting means being actuated by control means for preventing the wheel from being removed by a person who cannot operate said control means, such as a person who does not have the key.

* * * * *